Patented Nov. 22, 1949

2,488,747

UNITED STATES PATENT OFFICE 2,488,747

STARCH SEPARATION

George J. Strezynski, Chicago, Ill., assignor to The De Laval Separator Company, New York, N. Y., a corporation of New Jersey Application August 10, 1946, Serial No. 689,669

10 Claims. (Cl. 127—69)

This invention relates to the production of starch by separating starch and protein solids, each from the other, and at least partially from a common carrier liquid. More particularly, the invention has reference to a process for effecting such separation centrifugally, which may be practiced economically by reason of its use of a carrier liquid in a novel manner to prevent clogging of the system by the separated starch component.

For illustrative purposes, the invention will be described in connection with the separation, in a relatively pure state, of the starch and proteins normally contained in the tailings from standard starch tables as commonly used in the production of starch from corn. It will be understood, however, that the tailings may be obtained from any other suitable source.

Mill starch comes from the mill house in a suspension in water, which also contains a large quantity of proteins (gluten), fibres, droplets of grain oil, and other impurities, all of which may be termed the non-starch constituents. The mixture of water, starch and non-starch constituents from the mill house is caused to flow over "starch tables" where a major portion of the starch quickly settles out in a relatively pure state suitable for commercial use. A minor portion of the starch is carried over the tables in the tailings together with some gluten.

I have found that the starch and gluten in the tailings from the starch tables can be recovered economically as separate components in a relatively pure state, by centrifuging the tailings, provided that suitable provision is made for preventing clogging of the recovery system by the separated starch. Further, I have found that, while processes utilizing centrifuges in lieu of the starch tables are known, such processes are not entirely satisfactory and would be objectionable for use in the recovery treatment of the tailings from starch tables.

The starch component, when concentrated as a result of centrifuging, is extremely resistant to flow, as the concentrate tends to solidify and obstruct the system. In prior centrifugal processes for the production of starch, it is proposed to add wash water to the mixture from the mill house so that the dilution of the mixture is substantially increased before the centrifugal separation occurs, whereby the starch component from the centrifuge contains a substantial excess of water which serves as a carrier liquid to prevent clogging. In some cases water recovered from previous processing and stored in reservoirs, is added to the thick starch discharge from the centrifuge. Such processes, however, are objectionable because the added wash water is subjected to substantial bacterial contamination caused by the residual gluten left from previous processing, and this contamination adversely affects the starch. A considerable quantity of the added water leaves the centrifuge with the gluten component, and if this added water is to be recovered for storage and subsequent recirculation through the system, a high purification capacity for the water is required. If the added water is not recovered from the system, water from an external source must be supplied continuously, which adds to the expense.

The present invention, therefore, is directed to the provision of a process for recovering the starch and the gluten components from the tailings by centrifuging, in which the separated starch component is maintained in a free-flowing state by the use of water as a carrier liquid in such a manner that there is not undue dilution of either of the two components, and an adequate water supply may be maintained without a large purifying capacity.

In the practice of my process, the tailings from the starch table are passed to a locus of centrifugal force where they are separated into three components which are discharged in separate streams, one stream primarily water, a second stream rich in gluten, and a third stream rich in starch. The starch component, after the separation, is diluted with water, preferably with the separated water stream from the centrifuge without any intermediate storing of this water which would result in decomposition of residual gluten and contamination of the water. The diluted starch is then passed to a second locus of centrifugal force where it is further purified and discharged in a separate stream, the separated gluten and a substantial quantity of the water being likewise discharged in a separate stream or streams. The highly concentrated starch component from the second locus is again diluted with water after the separation, preferably by adding pure water to the starch component outside the locus of centrifugal separation but within the locus of centrifugal force. Alternatively, a substantial quantity of the water may be discharged from the second locus in a stream separate from the gluten and starch components, and water from this stream, if it is not too contaminated, may be used to dilute the separated starch component from the first or second centrifugal separation stages, or both. The separated water component from either or both of the centrifugal separation stages is preferably passed to a centrifuge for further separation of any remaining gluten, before the water is used to dilute the separated starch component.

With the new process, the carrier water for the separated starch component (obtained from a pure water source or from a separation stage, or both) is applied in such a manner as to minimize the length of its contact with the gluten component while maintaining the starch component at all times sufficiently free-flowing to effect its continuous transfer to the next stage of treatment. More particularly, since the starch carrier water is added after each centrifugal separation has occurred, preferably utilizing water freshly obtained from this centrifugal separation, bacterial contamination of the carrier water by the decomposing residual gluten is substantially reduced, so that the water supply in the system may be replenished as necessary without a large purifying capacity.

For a more complete understanding of the invention, reference may be had to the accompanying drawings, in which Fig. 1 is a schematic view of a system for use in practicing the invention as a continuous process;

Figure 1:
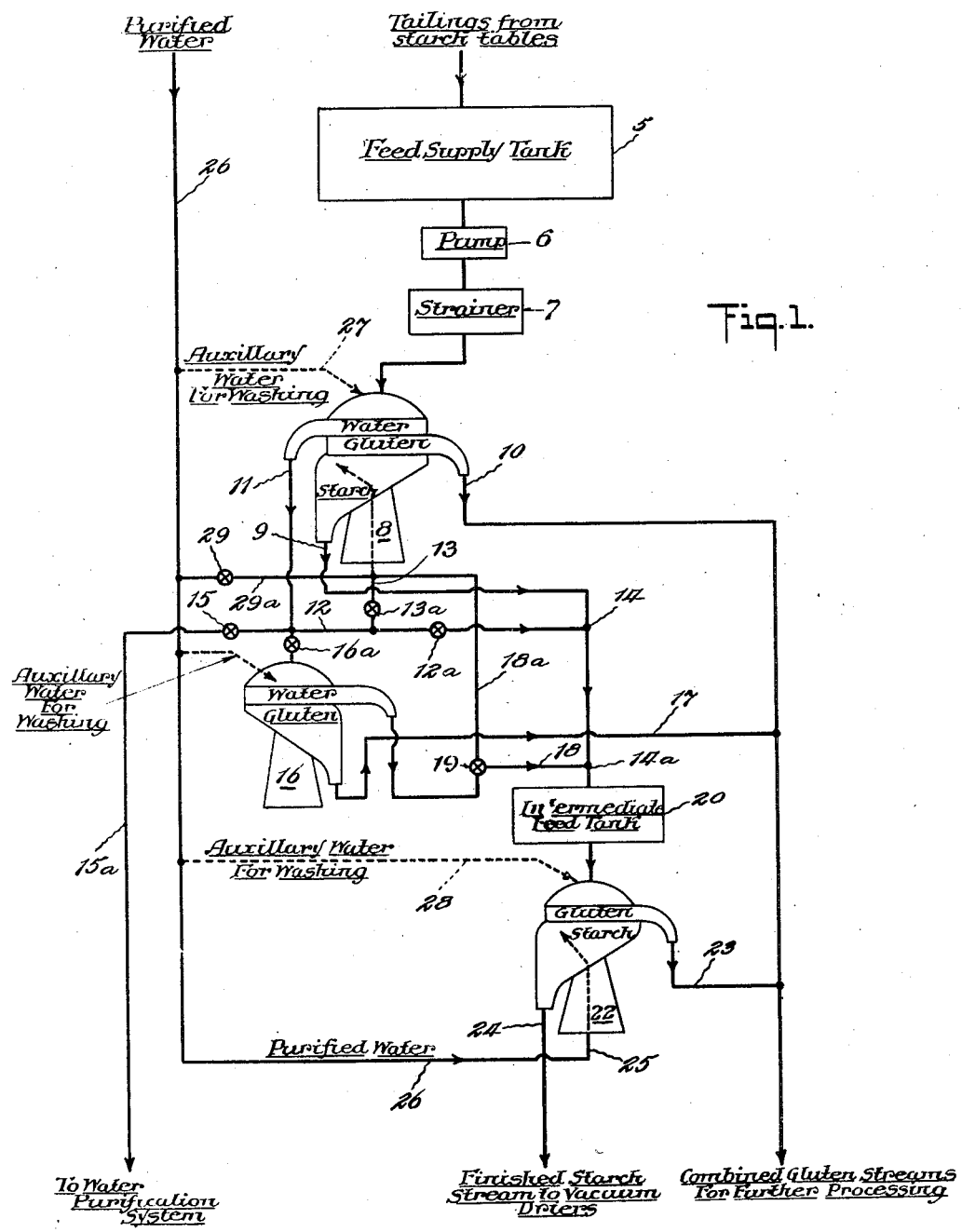

Referring to Fig. 1, the tailings from the starch tables (not shown) enter a feed supply tank 5 and are delivered from the tank through a pump 6 to a strainer 7 for removing coarse particles of foreign matter which may have been carried over the starch tables into the supply tank 5. From the strainer 7, the tailings are fed to a centrifuge 8 adapted to effect a three way separation of the mixture. If desired, a shaker screen (not shown) may be arranged between the strainer 7 and the centrifuge, the tailings being passed over the screen to break up starch clusters and assist in releasing foreign matter.

In the centrifuge 8, details of which will be described presently, the mixture is centrifugally separated into three components, that is, a component rich in starch and having a substantially smaller proportion of proteins than the original tailings, which is discharged in a separate stream 9 (hereinafter called the starch stream); a second component rich in protein and having only a small percentage of the starch in the original tailings, which is discharged in a separate stream 10 (hereinafter called the gluten stream); and a third component mostly clear water with traces of proteins or other non-starch constituents, or both, in solution, which is discharged in a separate stream 11 (hereinafter called the water stream). It will be understood that the starch stream represents the heaviest component, and the water stream represents the lightest component.

The separated starch component in the centrifuge 8 has a relatively high concentration of starch solids, for example, about 25 to 32 ounces per gallon, and therefore is not of sufficient fluidity for free flow to the next step of the process. However, the starch component, after the separation, is diluted with carrier water to form a stream which is free-flowing, for example, a stream having about 15 ounces of starch per gallon. This dilution of the starch component may be effected with the water stream 11, since the latter, due to the three-way separating action in the centrifuge, is substantially freed of the contaminating influence of the decomposing residual gluten. The dilution of the separated starch is effected in such a manner that return of the carrier water diluent with the gluten stream is avoided. More particularly, the separated starch component is preferably diluted by returning part or all of the separated water stream 11 through pipes 12 and 13 to the centrifuge 8 at the peripheral region thereof where the separated starch component accumulates. In other words, the water is delivered to the centrifuge at a region outside the locus of centrifugal separation but within the locus of centrifugal force, for example, adjacent the discharge nozzles for the separated starch. In this way, the separated and concentrated starch in the centrifuge is prevented from clogging the discharge openings for the starch, since the discharge openings will be of larger size to accommodate the combined throughput rate of the separated starch and the added water.

If desired, part of the water stream 11 may be fed through pipe 12 and valve 12a and combined with the starch stream 9, as at 14, after it has been discharged from the separator; or the return valve 13a may be closed so that all of the water stream 11 is fed to the starch stream outside the separator, although I prefer to return at least part of the separated water stream to the peripheral portion of the centrifuge as described. If the quantity of water in the discharge stream 11 is more than adequate to dilute the starch stream 9 to a consistency suitable for free flow, the excess water may be withdrawn through a valve 15 and a pipe 15a to a water purifier (not shown), where it is conditioned for further use in the system.

It may be found in some instances that the water stream 11 from the centrifuge contains an appreciable quantity of gluten which, if allowed to remain in the water would seriously affect the starch when the water is recombined with the separated starch component. Accordingly, I provide a centrifugal concentrator 16 to which the water stream 11 may be fed directly from the centrifuge 8 through valve 16a and in which any remaining gluten in suspension will be concentrated and separately discharged through an outlet 17 leading to the gluten discharge stream 10 from the centrifuge 8. The relatively pure water from concentrator 16 is separately discharged and fed through a pipe 18 for mixture with the starch stream, as at 14a, or through a pipe 18a to the return pipe 13, or both, as determined by a control valve 19.

The diluted starch stream 9 is led to a feed tank 20 from which it is passed to a second centrifuge 22. As shown in Fig. 1, the centrifuge 22 effects a two-way separation of the starch stream into a component containing any remaining gluten and a substantial quantity of the water, and a second component containing starch and some water, the two components being discharged separately in streams 23 and 24, respectively. The separated starch component 24 has a substantially higher degree of purity than the starch component from the first centrifuge 8, due to the reduced throughput rate to the centrifuge 22 and the higher degree of purity of the mixture fed to the second centrifuge. If desired, two first-step centrifuges 8 may be used and the combined starch and water streams from both may be fed to a single second-step centrifuge 22, without materially reducing the resulting purity of the starch stream 24 from the centrifuge 22.

Before the separated and concentrated starch component is discharged from the centrifuge 22, it is again diluted by introducing a stream of water into the centrifuge through pipe 25 at a point in which the added water will not dilute the gluten component, that is, in a region outside the locus of centrifugal separation but within the locus of centrifugal force. The starch component is thus rendered sufficiently dilute and free-flowing to effect its continuous discharge from the centrifuge, from which it may be passed in the stream 24 to vacuum dryers (not shown) for removing the remaining water. The gluten steam 23 is combined with the gluten stream 10 from the first centrifuge (and with the gluten discharge from concentrator 16) and delivered to suitable apparatus for further processing.

The water for diluting the separated starch component in centrifuge 22 is preferably obtained from a purified water line 26, which may receive the water from the purifier to which the excess water from the first centrifuge is fed through pipe 15a.

Thus, the separated starch in centrifuge 22 is discharged under the flushing action of the water added through pipe 25, without clogging the bowl outlets for the starch and without impairing the purity of the starch. Since the purified water is introduced into the centrifuge 22 in such a manner as to avoid intimate admixture with the separated gluten and water components in the bowl, it may ultimately be recovered from the starch stream 24 and used again in the system with little or no purification. Purified water from the line 26 may also be used to wash the centrifuges 8 and 22 by feeding the water to the bowl inlets through pipes 27 and 28, respectively.

In the event that the separated water stream 11 from centrifuge 8 is found to be so contaminated that it is unsuited for use in diluting the starch component separated in this centrifuge, even when the water stream is passed through the concentrator 16, it may be withdrawn entirely through the pipe 15a by closing valves 12a, 13a and 16a and opening valve 15, in which case the dilution of the separated starch may be effected by feeding purified water from line 26 through valve 29 and pipe 29a to the return pipe 13. The water withdrawn through pipe 15a may be passed through the bowl of a centrifugal oil purifier (not shown) to remove the grain oil in the water, the water discharge from the purifier being further purified, if necessary, before it is returned to the line 26.

Figure 2:
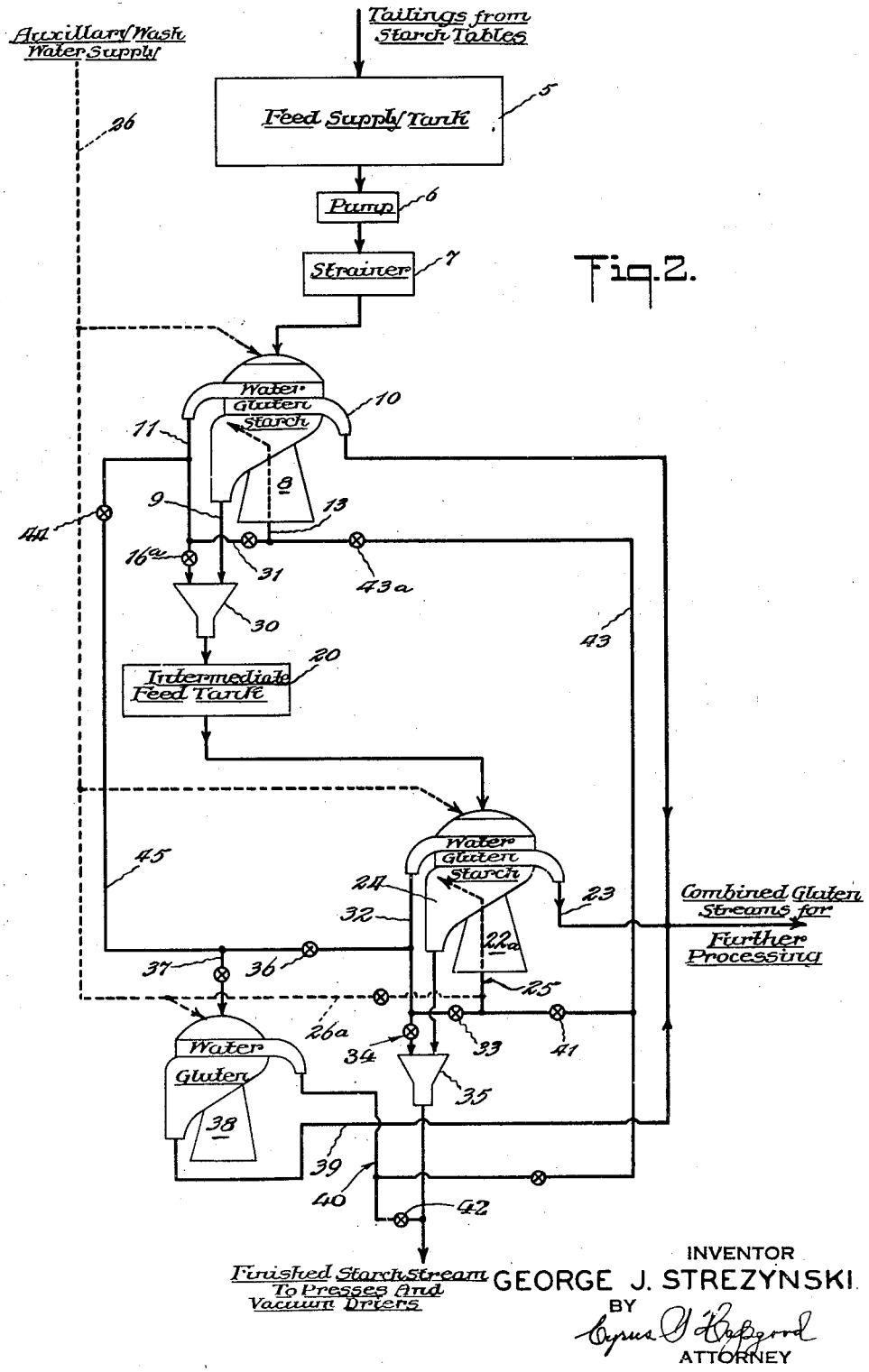
Fig. 2 is a similar view of a modified form of the system.

Depending upon the characteristics of the original tailings, it may be possible to utilize separated water from the second centrifuge for diluting the separated starch component in this second centrifuge, or the first centrifuge, or both, as shown in Fig. 2. The system there shown is similar to that illustrated in Fig. 1 through the first centrifugal separation stage. From the centrifuge 8, at least part of the water stream 11 is combined with the starch stream 9 by feeding the streams to a common funnel 30 leading to the intermediate feed tank 20. It will be understood, however, that part or all of the water stream 11 may be fed through a by-pass pipe 31 to the pipe 13 for returning it to the peripheral portion of the centrifugal bowl, as previously described.

The diluted starch stream from the feed tank 20 is delivered to a centrifuge 22a which separates the mixture into three components. One component, primarily water, is discharged separately in a stream 32; a second component, containing any remaining gluten and a substantial amount of water, is discharged in a separate stream 23; and a third component, the purified and concentrated starch with some water, is discharged in a stream 24. Water from the discharge stream 32 is delivered through a valve 33 to the pipe 25 which returns the water to the bowl of centrifuge 22a at the peripheral region where the separated starch accumulates, so that the returned water does not dilute the separated gluten in the bowl. Accordingly, the separated starch is again diluted to effect its uninterrupted discharge in the stream 24. Part of the water from the separated stream 32 may be used to dilute the separated starch component after it has been discharged in the stream 24, as by feeding the water part through a valve 34 and combining it with the starch stream in a common funnel 35.

Instead of mixing the water from stream 32 directly with the starch separated in centrifuge 22a, it may first be passed through valve 36 and pipe 37 to a centrifugal concentrator 38, where any remaining gluten in the water is concentrated and separately discharged through an outlet 39 to be combined with the gluten streams 10 and 23 from the centrifuges. The clear water is separately discharged from the concentrator 38 and delivered through pipe 40 and valve 41 to the return pipe 25, part of the water being possibly used to dilute the starch stream further, as through valve 42, after the starch has been discharged from the centrifuge.

If desired, clear water from the concentrator 38 may be fed through pipe 40, and branch pipe 43 and valve 43a to the return pipe 13 for the first centrifuge, in place of part or all of the initially separated water stream 11, and the latter may be delivered through valve 44 and pipe 45 to the concentrator 38 for purification and recirculation in the system. By proper valve adjustment, the concentrator 38 may be used to purify the separated water stream from the first centrifuge 8 or from the second centrifuge 22a, or from both, before the water is used to dilute the separated starch.

When the separated water stream 11 is used directly for diluting the starch separated in the centrifuge 8, it may be desirable in some instances to supplement it with water from the stream 32 separated in the second centrifuge, as by passing part of the stream 32 directly to the stream 11 through pipe 45. This procedure has the advantage that the water stream 32 is substantially purer than the stream 11, due to the separating action in centrifuge 22a, so that the purity of the latter stream is enhanced by mixing it with part of the stream 32.

It will be understood that by proper regulation of the valves, the dilution of the starch component separated in each stage may be effected by water separated in that stage or at least partly by water separated in the other stage, and the separated water from either or both stages may be used directly to dilute the separated starch, or part or all of it may first be purified in the concentrator 38, depending upon the condition of the original tailings, the characteristics of the system, and the degree of purity required in the final product. In any case, however, the starch component is made to flow freely by diluting it with the separated water promptly after the starch separation is effected in each stage, preferably while it is still in the bowl, and the starch is diluted in such a manner that dilution of separated gluten is avoided. Thus, the carrier water is added in such a manner as to increase the dilution of the separated starch while allowing a reduction in the dilution of the separated gluten. Since the water separated in the first stage is used at once (preferably after passing through the gluten concentrator 16 or 38) for the dilution of the starch, the need for a very high degree of purification of the water is eliminated. If such water were first collected in a large storage tank and allowed to stand for a few hours the gluten in the water would decay very rapidly and the water could not be reused without complete purification.

I have found that the new process may be practiced to advantage by adjusting the centrifuges 8 and 22a so that the rate of discharge of the gluten streams 10 and 23 is reduced in favor of a relatively high discharge rate of the water streams 11 and 32, whereby the gluten streams will have a fairly high concentration, in the order of 12 to 16 ounces per gallon, while the water streams will have a substantial amount of gluten, in the order of 5 to 12 ounces per gallon. The water streams 11 and 32 are then passed through valves 44 and 37, respectively, to the concentrator 38 which is adjusted to discharge the gluten into pipe 39 at approximately the same concentration as the gluten streams 10 and 23, the water being discharged in a substantially pure state into the pipe 40 and delivered through pipe 43 for use in diluting the separated starch from the first stage centrifuge. In this case, the water for diluting the starch from the second stage centrifuge 22a may be obtained from the pure water line 26 through a branch 26a leading to the return pipe 25.

Figure 3:
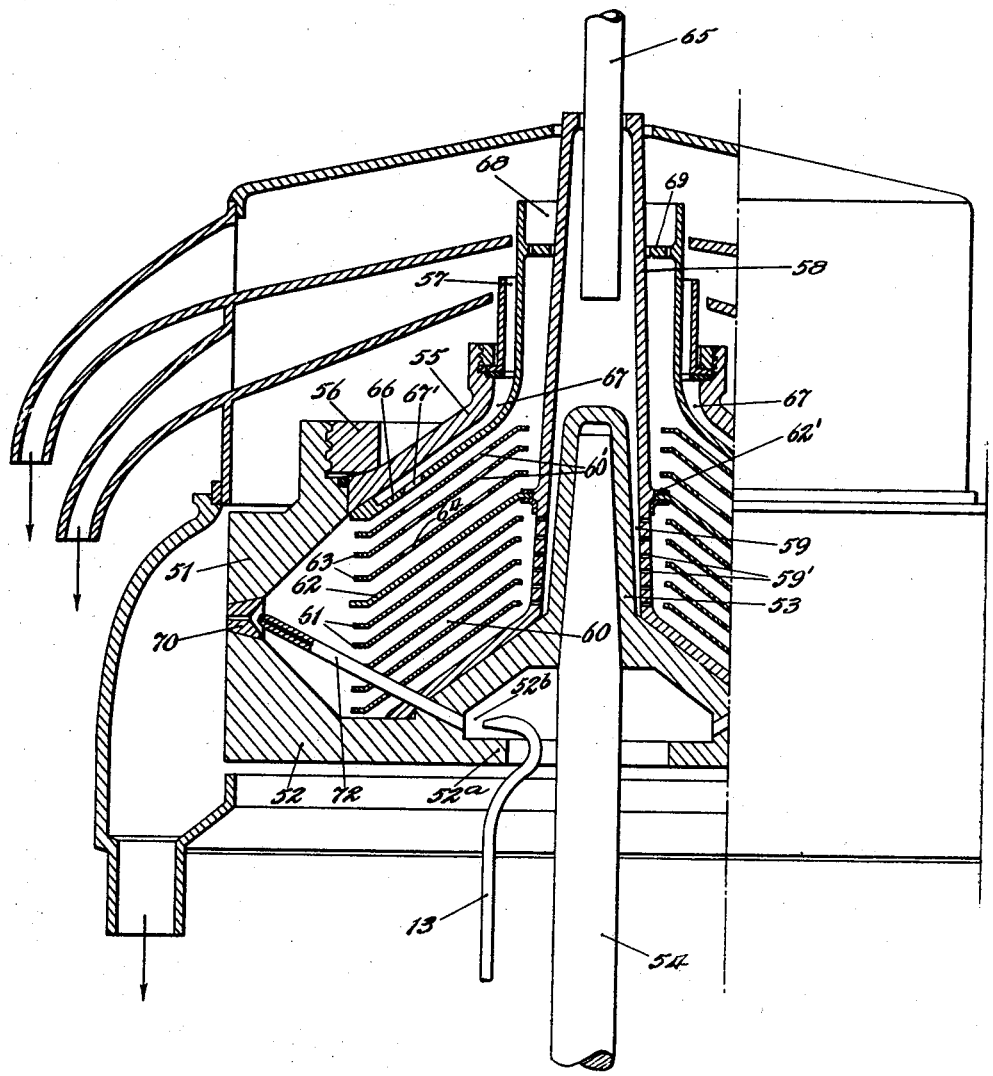
Fig. 3 is a vertical sectional view of a centrifuge which may be used in the system.

A centrifuge suitable for effecting the three-way separation previously referred to, for example, the centrifuge 8 is shown in part in Fig. 3, and comprises a bowl shell 51 having a bottom 52 with a socket 53 for receiving the driving and supporting spindle 54. An annular bowl top 55 is secured to the shell 51 by a coupling ring 56, and partly defines a discharge outlet 57. In the center of the bowl is a tubular shaft 58 into which the mixture to be separated is fed. The tubular shaft 58 encloses an annular passage 59 and has at its lower end portion a series of feed holes 59' through which the mixture from passage 59 is discharged into the spaces 60 between a series of blank discs 61. Discs 61 are arranged in an initial separating chamber in the lower portion of the bowl with their inner edges near the feed holes 59'. Above the discs 61 and separated therefrom by blank disc 62 is a second separating chamber having a series of discs 63 similar in size and shape to the discs 61. The discs 63, however, have one group of distributing holes 64 located near the outer edges of the discs and, if desired, a second group of holes 60' located near the bowl axis. It will be apparent that the upper separating chamber containing the discs 63 has communication with the lower separating chamber only around the extreme outer edge of the blank disc 62, because of a liquid-tight seal 62' between the discs 62 and the tubular shaft 58.

A feed supply tube 65, which receives the mixture from tank 5, extends downward into the space enclosed by the upper end portion of the tubular shaft 58 in the upper part of the bowl. A top disc 66 provides a division wall between the separating chambers in the bowl and a passage 67 leading to the discharge outlet 57. The top disc 66 is so constructed that it makes, at its lower or outer extremity, a liquid-tight joint with the bowl top 55, so that all liquid which is discharged at outlet 57 must enter passage 67 through holes 67' in the top disc arranged directly over the disc distributing holes 64. Passages also lead from the inner edges of the discs 63 upward through the neck of the top disc 66 to a second discharge outlet 68. Nozzles 70 in the wall of the bowl shell provide a third discharge outlet from the peripheral portion of the bowl.

The bottom 52 of the bowl has an inwardly extending lip 52a partly defining an annular recess 52b near the axis of the bowl, the recess 52b being adapted to receive carrier water from the return pipe 13 previously described. From the space 52b, the carrier water is conveyed outwardly by centrifugal force through tubes 72 extending into the bowl and terminating adjacent the nozzles 70.

In the operation of the bowl, the tailings fed through the tube 65 flow into the tubular shaft 58 and through passages 59' to the spaces 60 between the blank discs 61 in the first separating chamber, where a separation of the major portion of the relatively heavy starch solids takes place. Since starch will readily separate from the proteins and water in the feed, the latter is directed by passages 59' to a zone of relatively slight centrifugal force. The starch flows outward to the peripheral portion of the bowl and is continuously discharged through nozzles 70 by the flushing action of the carrier water or diluent introduced through the tubes 72.

The remainder of the feed, comprising primarily proteins and water, which are of lower specific gravity than the starch, flows inward toward the axis of the bowl and then upward along the outer wall of the tubular shaft 58 until it reaches the blind disc 62. Due to the liquid-tight seal 62' the flow is then directed along the bottom of the blank disc to its extreme outer edge. This passage of the mixture through a zone of greater centrifugal force than that to which it was originally subjected will remove the last traces of starch which may have been present in the water and gluten mixture. After passing around the outer edge of disc 62, the mixture will flow inwardly between the discs 63 to the distributing holes 64 and then upwardly in the second separating chamber. Here a separation between the gluten and the water takes place, the gluten passing through holes 67' in the top disc and then along the underside of the bowl top 55 and escaping through outlet 57. The water flows inward toward the bowl axis and then upward along the outer wall of the tubular shaft through the discharge ring 69, and finally escapes over the top of the neck of top disc 66 at the outlet 68.

I claim:

1. A continuous process for separating starch from tailings containing water, starch and gluten, which comprises feeding the tailings to a locus of centrifugal force and there separating it into three components, one relatively rich in starch, a second relatively rich in gluten, and a third primarily water, discharging the components from the locus in separate streams, diluting the starch component with carrier water after the centrifugal separation has occurred, feeding the diluted starch stream to a second locus of centrifugal force and there separating it into at least two components, one relatively rich in starch, and another primarily gluten in water, diluting said last starch component with carrier water while said last component is still in the second locus but after the second centrifugal separation has occurred, said last carrier water being introduced into the peripheral portion of the second locus beyond the separation zone thereof, discharging said last starch and gluten components from the second locus in separate streams, and returning at least part of said third water component from the first locus, as at least part of said carrier, to the starch component separated in one of said loci.

2. A continuous process as defined in claim 1, comprising also the step of purifying at least part of said separated water component from the first locus before it is returned as carrier water to the separated starch component.

3. A continuous process as defined in claim 1, comprising also the step of flowing at least part of said separated water component from the first locus, before it is returned as carrier water to the separated starch component, to a zone of centrifugal separation in which remaining impurities are concentrated and separated from the water.

4. A continuous process as defined in claim 1, in which at least part of the separated water component from the first locus is returned to the separated starch component as at least part of said first carrier water.

5. A continuous process for separating starch from tailings containing water, starch and gluten, which comprises feeding the tailings to a locus of centrifugal force and there separating it into three components, one relatively rich in starch, a second relatively rich in gluten, and a third primarily water, discharging the components from the locus in separate streams, diluting the starch component with carrier water after the centrifugal separation has occurred, feeding the diluted starch stream to a second locus of centrifugal force and there separating it into three components, one relatively rich in starch, a second containing remaining gluten in said starch stream, and a third primarily water, diluting said last starch component with carrier water while said last starch component is still in the second locus but after said second centrifugal separation has occurred, discharging said last starch, gluten, and water components from the second locus in separate streams, and returning at least part of the separated water stream from the second locus, as at least part of said carrier water, to the peripheral portion of one of said loci outside the separating zone thereof, for admixture with the separated starch in said last locus.

6. A process as defined in claim 5, in which at least part of the separated water stream from the second locus is returned, as at least part of said carrier water, to the starch components separated in both loci.

7. A process as defined in claim 5, in which at least parts of the separated water streams from both loci are returned, as at least part of said carrier water, to the starch component separated in one of said loci.

8. A process as defined in claim 5, comprising also the steps of feeding at least parts of the separated water streams from both loci to a zone of centrifugal separation in which remaining gluten is concentrated and withdrawn from said zone, and returning purified water from said zone, as at least part of said carrier water, to the starch components separated in both of said loci.

9. A process as defined in claim 5, in which the gluten and water streams from said loci are discharged with a gluten concentration in the order of 12 to 16 ounces per gallon and 5 to 12 ounces per gallon, respectively, and comprising the steps of feeding said water streams to a zone of centrifugal separation in which remaining gluten is concentrated in the order of 12 to 16 ounces per gallon and separately discharged from the zone.

10. A continuous process for separating starch from tailings containing water, starch and gluten, which comprises feeding the tailings to a locus of centrifugal force and there separating it into at least two components, one relatively rich in starch, and another relatively rich in gluten, discharging the components from the locus in separate streams, diluting the starch component with carrier water after the centrifugal separation has occurred, feeding the diluted starch stream to a second locus of centrifugal force, and there separating it into three components, one relatively rich in starch, a second relatively rich in gluten, and a third primarily water, diluting said last starch component with carrier water while said last starch component is still in the second locus but after said second centrifugal separation has occurred, discharging said last three components from the second locus in separate streams, and returning at least part of said third component stream, as at least part of said carrier water, to the peripheral portion of one of said loci outside the separation zone thereof, for admixture with the separated starch in said last locus.

GEORGE J. STREZYNSKI.

REFERENCES CITED

The following references are of record in the file of this patent:

UNITED STATES PATENTS

| Number | Name | Date |
| --- | --- | --- |
| 994,497 | Berrigan | June 6, 1911 |
| 1,923,455 | Peltzer | Aug. 22, 1933 |
| 1,960,985 | Acton | May 29, 1934 |
| 2,013,668 | Peltzer | Sept. 10, 1935 |
| 2,039,605 | Peltzer | May 5, 1936 |
| 2,251,448 | Giesecke | Aug. 5, 1941 |
| 2,323,077 | Peltzer | June 29, 1943 |
| 2,325,250 | Kelling | July 27, 1943 |

Certificate of Correction

Patent No. 2,488,747 November 22, 1949

GEORGE J. STREZYNSKI

It is hereby certified that errors appear in the printed specification of the above numbered patent requiring correction as follows:

Column 9, line 7, strike out the word "water" and insert the same in line 8, after "carrier" and before the comma;

and that the said Letters Patent should be read with these corrections therein that the same may conform to the record of the case in the Patent Office.

Signed and sealed this 4th day of April, A. D. 1950.

[SEAL]

THOMAS F. MURPHY,
*Assistant Commissioner of Patents.*